(12) United States Patent
Wang et al.

(10) Patent No.: US 10,621,717 B2
(45) Date of Patent: *Apr. 14, 2020

(54) SYSTEM AND METHOD FOR IMAGE-BASED TARGET OBJECT INSPECTION

(71) Applicant: General Electric Company, Schenectady, NY (US)

(72) Inventors: Wei Wang, Niskayuna, NY (US); Longyin Wen, Niskayuna, NY (US); Xiao Bian, Niskayuna, NY (US); Arpit Jain, Niskayuna, NY (US); David Scott Diwinsky, West Chester, OH (US); Bernard Bewlay, Niskayuna, NY (US)

(73) Assignee: General Electric Compnay, Schenectady, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 15/941,589

(22) Filed: Mar. 30, 2018

(65) Prior Publication Data

US 2019/0304077 A1 Oct. 3, 2019

(51) Int. Cl.
*G06T 7/00* (2017.01)
*G06T 7/13* (2017.01)
(Continued)

(52) U.S. Cl.
CPC .......... *G06T 7/001* (2013.01); *G06K 9/00744* (2013.01); *G06T 7/0004* (2013.01);
(Continued)

(58) Field of Classification Search
CPC ...... G06K 9/00744; G06T 2207/10016; G06T 2207/10024; G06T 2207/20076;
(Continued)

(56) References Cited

U.S. PATENT DOCUMENTS

| 2013/0113913 A1 | 5/2013 | Scheid et al. |
| 2013/0114879 A1* | 5/2013 | Scheid .................... G06T 7/001 382/145 |

(Continued)

FOREIGN PATENT DOCUMENTS

WO 2017017422 A1 2/2017

OTHER PUBLICATIONS

Harding et al. "Blade Counting Tool with a 3D Borescope for Turbine Applications" SPIE Optical Engineering + Applications; Aug. 2014 (11 pages).
(Continued)

*Primary Examiner* — Manuchehr Rahmjoo
(74) *Attorney, Agent, or Firm* — The Small Patent Law Group LLC; Philip S. Hof

(57) ABSTRACT

A system includes one or more processors configured to detect perimeter edges of one or more rotor blades of a turbine assembly as depicted in a series of image frames using boundary analysis performed on the image frames. The one or more processors are configured to identify a set of the image frames as key frames based on positional offsets between the perimeter edges that are detected in the image frames and a reference blade pose such that the key frames are able to be inspected for objects-of-interest without inspecting the image frames that are not the key frames.

19 Claims, 7 Drawing Sheets

(51) Int. Cl.
*G06K 9/00* (2006.01)
*G06T 7/12* (2017.01)
*G06T 7/73* (2017.01)

(52) U.S. Cl.
CPC .............. *G06T 7/0008* (2013.01); *G06T 7/12* (2017.01); *G06T 7/13* (2017.01); *G06T 7/74* (2017.01); *G06T 2207/10016* (2013.01); *G06T 2207/10024* (2013.01); *G06T 2207/20076* (2013.01); *G06T 2207/20081* (2013.01); *G06T 2207/20084* (2013.01); *G06T 2207/30164* (2013.01)

(58) Field of Classification Search
CPC . G06T 2207/20081; G06T 2207/20084; G06T 2207/30164; G06T 7/0004; G06T 7/0008; G06T 7/001; G06T 7/12; G06T 7/13; G06T 7/74
See application file for complete search history.

(56) References Cited

U.S. PATENT DOCUMENTS

| | | |
|---|---|---|
| 2016/0178532 A1 | 6/2016 | Lim et al. |
| 2016/0209636 A1 | 7/2016 | Baleine et al. |
| 2016/0314571 A1 | 10/2016 | Finn et al. |
| 2017/0167953 A1 | 6/2017 | Diwinsky et al. |
| 2018/0342069 A1* | 11/2018 | Lim ..................... G06T 7/0008 |

OTHER PUBLICATIONS

Adair et al. "Blending Borescope Inspection (BBI) Maintenance Service Equates to Cost Savings" IEEE Systems Readiness Technology Conference on Autotestcon; Aug. 1998 (8 pages).

Venbar et al. "A Haptic Virtual Borescope for Visual Engine Inspection Training" IEEE Symposium on 3D User Interfaces Mar. 2008 (8 pages).

* cited by examiner

SYSTEM AND METHOD FOR IMAGE-BASED TARGET OBJECT INSPECTION

FIELD

The subject matter described herein relates to inspection systems that are configured to analyze image frames to inspect target objects.

BACKGROUND

Image analysis systems can be used to inspect the condition, health, or status of various target objects, such as machinery in industrial, automotive, and aeronautic applications. The image analysis systems typically inspect a given target object by obtaining image data of the target object in operation. The image analysis systems analyze the image data that is received using one or more neural networks and/or other image analysis techniques to search for specific features or objects within the image data. The automated analysis provided by the image analysis systems may be significantly more efficient and/or accurate than traditional manual inspection performed by a human operator either examining the target object directly or examining the image data of the target object.

The analysis techniques and calculations employed by the automated image analysis systems may be computationally intensive. Due to the complex computations, the efficiency of known image analysis systems may be reduced as the workload of image data to analyze increases. The inefficiency due to the increased workload may slow down the speed at which the image analysis systems are able to analyze the image data and reach an outcome (e.g., relative to more efficient image analysis processes and systems). The inefficiency may also require addition electrical energy for powering and/or cooling the processing hardware that performs the computations. One option for improving the operational efficiency of the image analysis systems is to modify the image analysis techniques to reduce the complexity and intensity of the computations performed. However, simplifying the image analysis techniques may denigrate the quality (e.g., accuracy and/or precision) of the inspection.

SUMMARY

In an embodiment, a system (e.g., an inspection system) is provided that includes one or more processors configured to detect perimeter edges of one or more rotor blades of a turbine assembly as depicted in a series of image frames using boundary analysis performed on the image frames. The one or more processors are configured to identify a set of the image frames as key frames based on positional offsets between the perimeter edges that are detected in the image frames and a reference blade pose such that the key frames are able to be inspected for objects-of-interest without inspecting the image frames that are not the key frames.

In an embodiment, a method (e.g., for performing image-based target object inspection) is provided that includes obtaining a series of image frames depicting multiple rotor blades of a turbine assembly while the turbine assembly rotates. Each of the image frames depicts one or more of the rotor blades. The method includes detecting perimeter edges of the one or more rotor blades depicted in each of the image frames using boundary analysis performed on the image frames by one or more processors. The method also includes identifying, via the one or more processors, a set of the image frames as key frames based on positional offsets between the perimeter edges that are detected in the image frames and a reference blade pose, and inspecting the key frames for objects-of-interest without inspecting the image frames that are not in the set of the key frames.

In an embodiment, a method (e.g., for performing image-based target object inspection) is provided that includes detecting perimeter edges of one or more rotor blades of a turbine assembly as depicted in a series of image frames using boundary analysis performed on the image frames by one or more processors. The method includes identifying, via the one or more processors, a set of the image frames as key frames based on positional offsets between the perimeter edges that are detected in the image frames and a reference blade pose. The method also includes applying a mask image on the key frames to define an exposed region on the key frames. The exposed region represents a surface area of a primary rotor blade in the respective key frame. The method further includes inspecting the exposed regions of the key frames to detect objects-of-interest on the respective primary rotor blades without inspecting regions of the key frames outside of the exposed regions.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
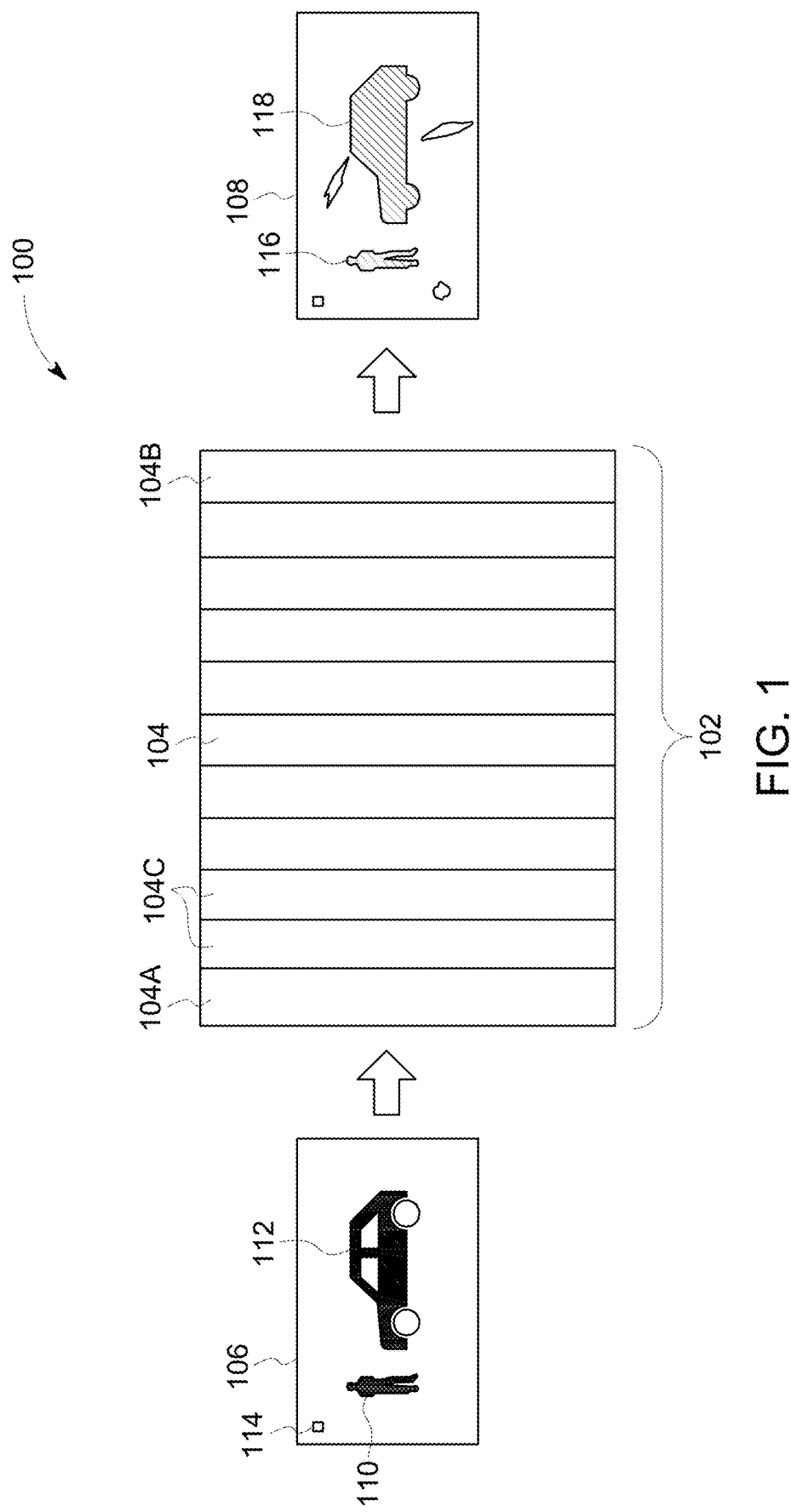
FIG. 1 illustrates one embodiment of a neural network system used for image analysis.

The embodiments described herein provide an inspection system and a method for performing image-based target object inspection having improved efficiency over known image-based inspection systems and methods. For example, the embodiments of the inspection system and method may increase efficiency by intelligently filtering out redundant and irrelevant image data before performing image analysis on the remaining, non-filtered image data.

The image data may be defined within multiple image frames acquired over time, where each of the image frames shows a portion of a rotating target object at a different moment in time. It may be desirable to inspect the target object to detect specific objects-of-interest, such as defects, by analyzing the image frames. But, some of the areas of the target object may be captured in multiple image frames, so performing image analysis on each of the image frames showing the same area of the target object could be redundant and/or a waste of computational resources. Additionally, some of the image data in the image frames may depict subject matter that is not relevant to the inspection task, such as background environment behind the target object, portions of the target object that are in undesirable positions for image-based inspection, and/or portions of the target object that are not intended to be inspected.

One or more embodiments of the inspection system and method described herein select the image frames that show different areas of the target object in desirable positions for analysis while filtering out the other, non-selected frames that may show these same areas of the target object is less-desirable positions, such as positions that do not reveal information needed for analysis of the target object. Optionally, image analysis may be performed only on the selected image frames, which can be referred to herein as key frames. Filtering out the non-selected image frames reduces the workload on the processors performing the image analysis without impairing the inspection quality because the subject matter filtered out is redundant to the subject matter in the key frames.

Furthermore, the embodiments of the inspection system and method may filter or mask regions of the key frames that are determined to be irrelevant for the inspection task. For example, the regions of the key frames that depict the background environment, the portions of the target object shown in undesirable positions, and/or the portions of the target object not intended to be inspected may be masked. Only the remaining non-masked or exposed regions of the key frames may be analyzed for object-of-interest detection. At least one technical effect of the subject matter described herein provides for automated filtering out of redundant and/or irrelevant image data in a visual inspection system so that the amount of image data that is submitted for object-of-interest image analysis can be significantly reduced without compromising the inspection quality. As a result of the reduced workload, the inspection of the target object may be performed more efficiently than some other known image analysis systems (e.g., that do not filter the image data in the image frames prior to performing image analysis).

FIG. 1 illustrates one embodiment of a neural network system 100 used for image analysis. The neural network system 100 provides automated object-of-interest detection and recognition in images using one or more deep artificial neural networks 102 (referred to herein as "neural network" 102). The neural network 102 is formed from one or more processors (e.g., microprocessors, integrated circuits, field programmable gate arrays, or the like). The neural network 102 is divided into two or more layers 104, such as an input layer 104A that receives an input image 106, an output layer 104B that outputs an output image 108, and one or more intermediate layers 104C between the input layer 104A and the output layer 104B. The layers 104 of the neural network 102 represent different groups or sets of artificial neurons or nodes, which can represent different functions performed by the one or more processors on the input image 106 to identify objects or features in the input image 106. The artificial neurons apply different weights in the functions applied to the input image 106 to attempt to identify the objects in the input image 106.

The output image 108 is generated by the neural network 102 by assigning or associating different pixels in the output image 108 with different object classes based on analysis of characteristics of the pixels. An object class is a type or category of an object appearing in the image. For example, a human body can be one object class, and an automobile is a different, second object class. A pixel can be labeled (e.g., associated) with probabilities that the pixel represents various different object classes by a vector [a b c d], where the values of a, b, c, and d indicate the probability of the pixel representing each of different classes of objects or things. Because the neural network 102 may not be 100% accurate in predicting what objects are represented by different pixels, the output image 108 may not exactly resemble or depict the objects in the input image 106, as shown in FIG. 1.

The artificial neurons in the layers 104 of the neural network 102 can examine individual pixels 114 that form the input image 106. The processors (operating as the artificial neurons) can use linear classification to calculate classification scores for different categories of objects (referred to herein as "classes"), such as a tree, a car, a person, spalling of a thermal barrier coating, a crack in a surface, a sign, or the like. These classification scores can indicate the probability that a pixel 114 represents different classes. For example, the classification score for a pixel 114 can be represented as a vector (e.g., the vector [a b c d] described above). The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels 114, which can be used to identify the objects in the input image 106.

In at least one embodiment, the input image 106 is provided to the neural network 102 via one or more wired and/or wireless connections from a source, such as a camera or borescope. The neurons in the layers 104 of the neural network 102 examine the characteristics of the pixels 114 of the input image 106, such as the intensities, colors, or the like, to determine the classification vectors for the various pixels 114. The layers 104 of artificial neurons in the neural network 102 can examine the input image 106 in sequential order, with one intermediate (or hidden) layer 104C of the neurons examining each pixel 114, followed by the neurons in an adjacent intermediate layer 104C, and so on, to calculate the classification vectors of the pixels 114. The application of functions to characteristics of a pixel 114 by the neurons in a layer 104 is based on the results of the functions applied by the neurons in the preceding layers 104 in the neural network 102.

After the layers 104 of the neural network 102 have determined the classification vectors for the pixels 114, the neural network 102 examines the classification vector of each pixel 114 and determines which object class has the highest probability for each pixel 114 or which object class has a higher probability than one or more, or all, other object classes for each pixel 114. For example, a first pixel in the input image 106 having a classification vector of [0.6 0.15 0.05 0.2] indicates that the neural network 102 calculated a 60% probability that the first pixel represents a first object class (e.g., a human body or person), a 15% probability that the first pixel represents a second object class (e.g., a car), a 5% probability that the first pixel represents a third object class (e.g., a tree), and a 20% probability that the first pixel represents a fourth object class (e.g., the ground).

The output image 108 is a representation based on the determined probabilities for the pixels 114 in the input image 106. For example, different areas 116, 118 in the output image 108 are representative of the objects 110, 112, respectively, in the input image 106. The areas 116, 118 may slightly represent the corresponding objects 110, 112, but do not accurately represent or indicate the objects 110, 112 due to the probabilities in the classification vectors for at least some of the pixels 114 being less than 100%. The processors can determine that each pixel 114 represents the object class having the greatest or largest probability in the corresponding classification vector for that pixel 114. For example, the processors can determine that the first pixel described above represents a human person due to the 60% probability. This process can be repeated for several, or all, other pixels 114 in the input image 106.

The weight values associated with each vector and neuron in the network constrain how input images are related to outputs of the neurons. Weight values can be determined by the iterative flow of training data through the network. For example, weight values are established during a training phase in which the network learns how to identify particular object classes by typical input data characteristics of the objects in training or ground truth images. During the training phase, labeled training or ground truth images are input into the artificial neural network. A labeled training image is an image where all or a substantial portion of the pixels forming the image are associated with an object class. In a labeled training image, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Additional training of the neural network 102 using labeled training images or ground truth images can improve the accuracy of the neural network 102 at recognizing objects in images that are input into the neural network 102, such that the areas 116, 118 in the output image 108 more closely resemble the corresponding objects 110, 112 in the input image 106. Additional training of the neural network 102 can improve the accuracy by increasing the determined probabilities that given pixels represent specific classes of the multiple object classes. The probabilities are increased by modifying the weights and/or functions of the artificial neurons in the different layers 104.

Figure 2:
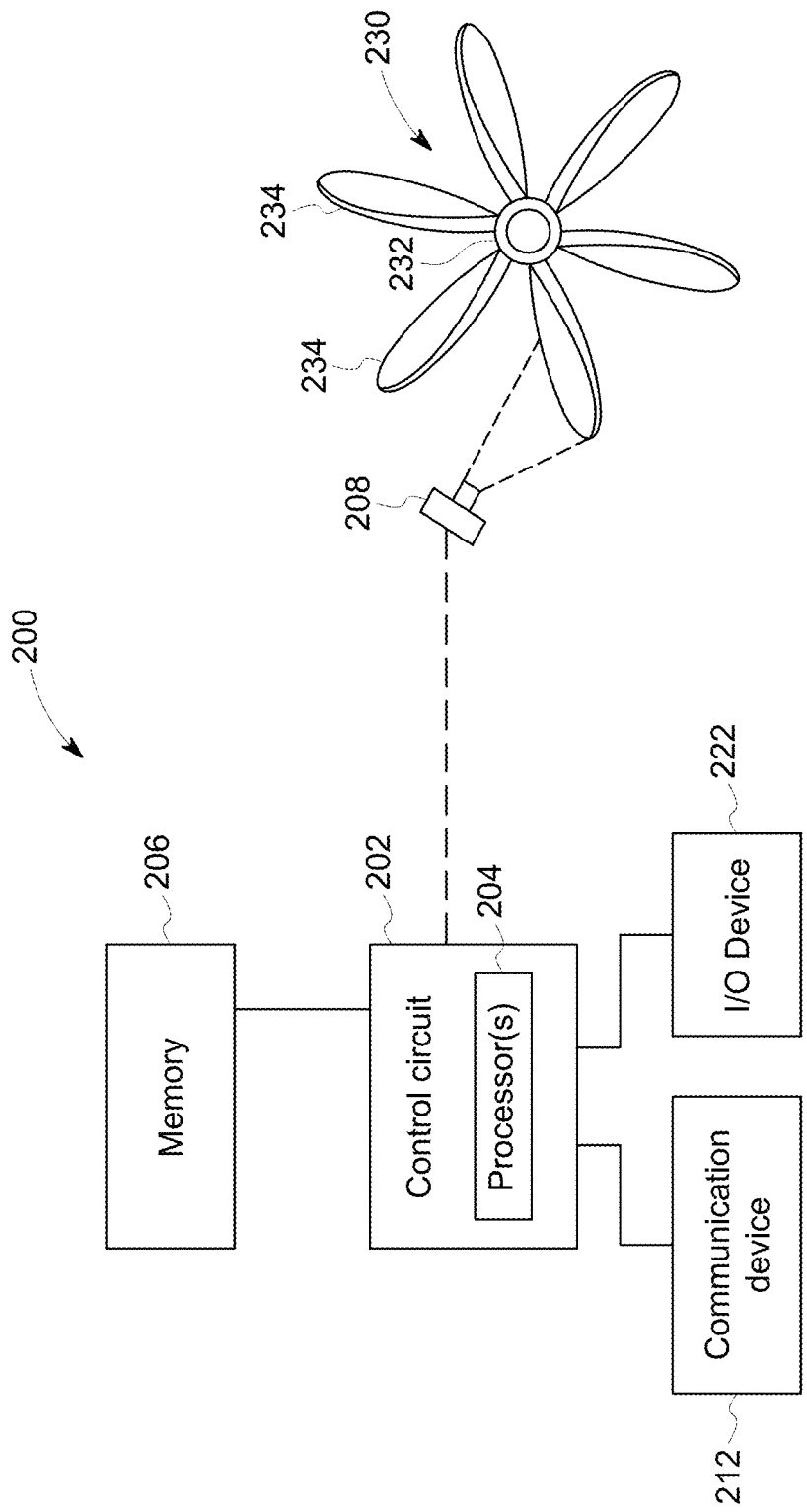
FIG. 2 is a block diagram of an inspection system according to an embodiment.

FIG. 2 is a block diagram of an inspection system 200 according to an embodiment. The inspection system 200 includes a control circuit 202 that is operably connected to a memory storage device 206. The control circuit 202 includes one or more processors 204. The memory storage device 206 is a tangible and non-transitory computer readable medium, and is referred to herein as "memory" 206. The inspection system 200 may also include an imaging device 208. The imaging device 208 is configured to acquire image data depicting a target object. In the illustrated embodiment, the target object is a turbine assembly 230 that includes multiple rotor blades 234 mechanically coupled to, and projecting radially outward from, a central drum or shaft 232. The imaging device 208 is poised to acquire image data of the rotor blades 234 as the turbine assembly 230 rotates about the drum 232. The control circuit 202 and the memory 206 are configured to obtain the image data of the rotor blades 234 from the imaging device 208.

The control circuit 202 (e.g., the one or more processors 204 thereof) is configured to analyze the image data to inspect the turbine assembly 230. For example, as described in more detail herein, the control circuit 202 is configured to analyze the image data to filter out and discard image data that is redundant and/or irrelevant, yielding a set of image data depicting discrete and relevant portions of the turbine assembly 230. After selecting the set of discrete and relevant image data, the control circuit 202 may be configured to perform automated object-of-interest detection on the selected set of image data. The automated object-of-interest detection may be a machine learning algorithm or analysis technique that is configured to detect one or more particular objects or features in the image data of the rotor blades 234, such as spalling, cracks, and other defects. For example, the memory 206 may store the artificial neural network 102 shown in FIG. 1, which may be trained to recognize and detect defects such as spalling and cracks on rotor blades. The control circuit 202 may access the memory 206 to examine the selected set of image data within the neural network 102. Alternatively, the selected set of image data may be transmitted to another processing device that performs the automated object-of-interest detection on the selected set.

The control circuit 202 includes and/or represents one or more hardware circuits or circuitry that include, are connected with, or that both include and are connected with one or more processors 204, controllers, and/or other hardware logic-based devices. The control circuit 202 may include a central processing unit (CPU), one or more microprocessors, a graphics processing unit (GPU), or any other electronic component capable of processing inputted data according to specific logical instructions. For example, the control circuit 202 may execute instructions stored on the memory 206 or stored on another tangible and non-transitory computer readable medium. The memory 206 may include or represent a flash memory, RAM, ROM, EEPROM, and/or the like. The memory 206 may store the image data of the target object obtained by the imaging device 208. The memory 206 is also configured to store a reference blade pose 350 (shown in FIG. 4) which is used by the control circuit 202 to select the key frames, as described herein. The memory 206 may also be used to store one or more artificial neural networks, such as the neural network 102. The control circuit 202 may access the memory 206 to retrieve the image data and the reference blade pose, and to examine the image data within the one or more neural networks. In an alternative embodiment, the memory 206 does not store any neural networks because the selected key frames are remotely communicated for object-of-interest detection instead of being performed locally by the control circuit 202 using the one or more neural networks stored within the memory 206.

The imaging device 208 is configured to acquire or capture the image data over time. The imaging device 208 may be stationary, and may acquire image data of the rotor blades 234 as the turbine assembly 230 rotates. The image data is represented by a series of image frames. The image frames may be still images and/or frames of a video. The imaging device 208 may be a camera, a sensor, a scanner, or the like. Each of the image frames is comprised of image data representing the subject matter in a field of view of the imaging device 208 at the time that the specific image frame was captured. In one or more embodiments, the imaging device 208 is set up relative to the turbine assembly 230 such that the field of view of the imaging device 208 captures only a portion of the turbine assembly 230. For example, each image frame acquired by the imaging device 208 may depict only one or more of the blades 234 of the turbine assembly 230, such as only one, only two, or only three of the blades 234. As the turbine assembly 230 rotates, the rotor blades 234 move through the field of view of the imaging device 208 in a uniform pattern of movement. For example, the rotor blades 234 may sequentially move downward from a top of the field of view to a bottom of the field of view before exiting the field of view entirely.

The imaging device 208 is configured to acquire the image frames of the turbine assembly 230 at a set frame acquisition rate as the turbine assembly 230 rotates. The frame acquisition rate may be set to differ from the rotational speed of the turbine assembly 230, such that over time each of the rotor blades 234 is depicted, at least partially, in multiple different image frames captured by the imaging device 208. If the frame acquisition rate is equivalent to, or is a multiple of, the rotational speed of the turbine assembly 230, then the image frames may only depict a subset of the rotor blades 234 without capturing each of the rotor blades 234. In at least one embodiment, the frame acquisition rate is sufficiently high such that a specific rotor blade 234 of the turbine assembly 230 can be tracked moving through the field of view of the imaging device 208 within at least two image frames acquired in sequence.

In an embodiment, the turbine assembly 230 may be a turbine used in a gas turbine engine, a turbocharger, or the like. For example, when the turbine assembly 230 is a component of a gas turbine engine, the blades 234 represent airfoils of the gas turbine engine. The turbine assembly 230 may have a different number of rotor blades 234 in other embodiments, and the rotor blades 234 may have different shapes and/or spacing around the drum 232. For example, the turbine assembly 230 may include dozens or hundreds of the blades 234, and the blades 234 may be disposed closer together than the illustrated embodiment. In an alternative embodiment, instead of a turbine assembly, the target object that is captured by the imaging device 208 may be another component of an engine, a wheel, or the like.

Optionally, the control circuit 202 is operably connected to an input/output (I/O) device 222 of the inspection system 200. The I/O device 222 may include a display and/or a user interface that allows an operator to interact with the control circuit 202. The user interface is configured to receive inputs from the operator of the inspection system 200. For example, the operator may use the user interface to activate and deactivate the operation of the imaging device 208, select the settings of the imaging device 208 (e.g., frame acquisition rate), and the like. The user interface may include a keyboard, a mouse, a touchpad, one or more physical buttons, and/or the like. The display may be a liquid crystal display (e.g., light emitting diode (LED) backlight), an organic light emitting diode (OLED) display, a plasma display, a CRT display, and/or the like. The display may be configured to display the image frames obtained by the imaging device 208. Optionally, the display may be a touch screen display, which includes at least a portion of the user interface. Optionally, the I/O device may include additional outputs, such as audio speakers, vibrating devices, or the like, for alerting the operator.

The control circuit 202 may be operably coupled to a communication device 212 of the inspection system 200. The communication device 212 may include hardware such as a transceiver, receiver, transmitter, and/or the like, and associated circuitry (e.g., antennas). The communication device 212 is configured to wirelessly communicate with the imaging device 208 and/or another device, such as a remote server, a mobile device (e.g., held by an operator), or the like.

The control circuit 202 is configured to obtain the image frames acquired by the imaging device 208. For example, the control circuit 202 may receive the image frames directly from the imaging device 208 via a wired conductive pathway (e.g., an electrical cable) or wirelessly via the communication device 212. In another embodiment, the image frames may be transmitted from the imaging device 208 to a remote device, such as a server, and the remote device may transmit the image frames to the control circuit 202. The control circuit 202 may store the received image frames in the memory 206.

The inspection system 200 in the illustrated embodiment includes the control circuit 202, the memory 206, the I/O device 222, the communication device 212, and the imaging device 208, although it is recognized that at least some of the components may be disposed in separate and discrete devices. In at least one embodiment, the control circuit 202, the memory 206, the communication device 212, and the I/O device 222 may be components within a common device, such as a computer (e.g., desktop, laptop, tablet, smart phone, mobile work station, etc.). For example, although not shown, the control circuit 202, the memory 206, the communication device 212, and the I/O device 222 may be commonly surrounded by a housing or case. The imaging device 208 may represent a separate and discrete device that is located outside of and remote from the housing. The imaging device 208 is operably connected to the control circuit 202 via a wired connection (e.g., a plug) or a wireless communication link. In another embodiment, the imaging device 208 may be a component in the same device as at least the control circuit 202 and the memory 206. The communication device 212 and the I/O device 222 may be optional components of the inspection system 200.

Figure 3:
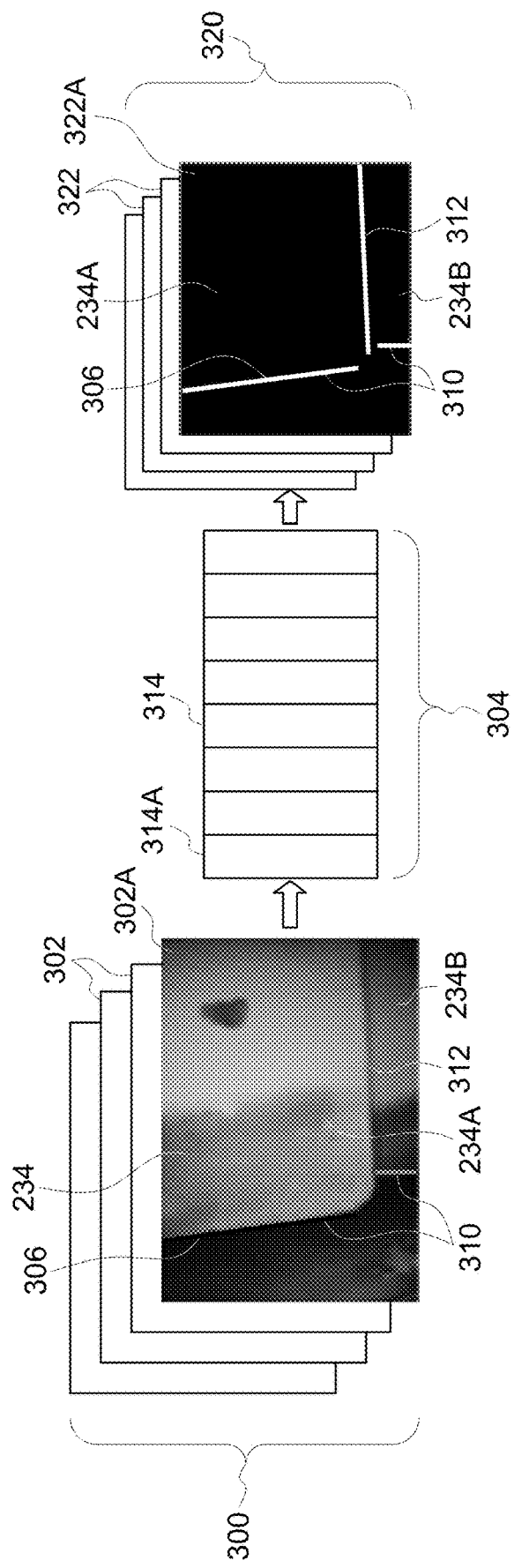
FIG. 3 is a diagram showing a series of image frames poised for examination using an artificial neural network trained to detect boundaries of target objects depicted in image data.

FIG. 3 is a diagram showing a series 300 of image frames 302 poised for examination using an artificial neural network 304 trained to detect boundaries of target objects depicted in image data. The series 300 of image frames 302 represent at least some of the image frames obtained by the imaging device 208 (shown in FIG. 2). For example, each of the image frames 302 depicts one or more blades 234 of the turbine assembly 230 (FIG. 2). The image frames 302 are captured at different times as the turbine assembly 230 rotates. The series 300 may include any number of image frames 302, such as hundreds or thousands of image frames 302. In one or more embodiments described herein, once the control circuit 202 (e.g., the one or more processors 204 thereof) shown in FIG. 2 obtains the series 300 of image frames 302 acquired by the imaging device 208. The control circuit 202 is configured to filter out image data within the image frames 302 that is determined to be redundant and/or irrelevant to the inspection task, thereby reducing the amount of image data that is subjected to computationally-intensive analysis techniques for detecting objects-of-interest, such as defects, on the rotor blades 234. For example, the control circuit 202 may selectively filter out some of the image frames 302 from the series 300, according to programmed instructions, to reduce the number of the image frames 302 that are analyzed for detecting defects or other objects-of-interest on the rotor blades 234.

The control circuit 202 (e.g., the one or more processors 204 thereof) is configured to perform boundary analysis on the series 300 of image frames 302 to detect perimeter edges 306 of the one or more rotor blades 234 depicted in the image frames 302. Although a boundary detection neural network 304 is used to perform the boundary detection in the illustrated embodiment, in an alternative embodiment, a different image analysis technique may be used to detect the perimeter edges 306 of the rotor blades 234 in the image frames 302. For example, the image analysis technique may include one or more of edge detection, edge fitting, edge registration, or the like.

The control circuit 202 may utilize the perimeter edges 306 that are detected to filter out redundant and/or irrelevant image data prior to performing image analysis techniques to detect objects-of-interest in the remaining, non-filtered image data. The perimeter edges 306 of the rotor blades 234 depicted in the image frames 302 include distal edges 310 and longitudinal edges 312. For example, each of the rotor blades 234 of the turbine assembly 230 may extend from the drum 232 (FIG. 2) radially outward to a respective distal edge 310 that is opposite to the end attached to the drum 232. Each rotor blade 234 also includes at least two longitudinal edges 312 that extend the length of the rotor blade 234 from the drum 232 to the respective distal edge 310.

The first image frame 302A in the series 300 shown in FIG. 3 depicts a first rotor blade 234A and a second rotor blade 234B that is adjacent to the first rotor blade 234A. Although the first rotor blade 234A may have an equivalent size to the second rotor blade 234B, a greater percentage of the first rotor blade 234A is depicted in the first image frame 302A than the percentage of the second rotor blade 234B depicted in the first image frame 302A due to the positioning of the turbine assembly 230 relative to the imaging device 208 when the first image frame 302A was captured. For example, the first rotor blade 234A occupies a greater area within the first image frame 302A than the second rotor blade 234B. The first image frame 302A shows portions of the distal edges 310 of each of the first and second rotor blades 234A, 234B, and a lower longitudinal edge 312 of the first rotor blade 234A.

The longitudinal edges 312 may be referred to herein as "upper" and "lower" longitudinal edges 312 to identify and distinguish between the two longitudinal edges 312 of each rotor blade 234, and the designations "upper" and "lower" are based only on the illustrated orientations of the rotor blades 234. Neither the upper longitudinal edge of the first rotor blade 234A nor the lower longitudinal edge of the second rotor blade 234B is shown in the first image frame 302A due to being outside of the field of view of the imaging device 208 when the first image frame 302A was captured. In the illustrated embodiment, the first rotor blade 234A overlaps the second rotor blade 234B, such that the lower longitudinal edge 312 of the first rotor blade 234A is visible but the upper longitudinal edge of the second rotor blade 234B is concealed behind the first rotor blade 234A.

The artificial neural network 304 may represent, or may be similar to, the neural network 102 shown in FIG. 1. In at least one embodiment, the control circuit 202 is configured to utilize the neural network 304 to detect the perimeter edges 306 of the rotor blades 234 depicted in the image frames obtained from the imaging device 208. The neural network 304 may be referred to herein as a boundary detection neural network 304. The boundary detection neural network 304 is trained to detect the perimeter edges 306 of the rotor blades 234 within the image frames 302 that are input into the boundary detection neural network 304. In an embodiment, the boundary detection neural network 304 is a convolutional neural network, which is a class of deep artificial neural networks. The boundary detection neural network 304 includes multiple layers 314 that are trained to identify representations for a given task. In the boundary detection task, the boundary detection neural network 304 is trained to identify and distinguish between the distal edges 310 and the longitudinal edges 312 of the rotor blades 234 depicted in the image frames 302. The boundary detection neural network 304 may be trained using a set of annotated training images, as described above with reference to the neural network 102 in FIG. 1. The boundary detection neural network 304 may be trained to distinguish the perimeter edges 306 of the rotor blades 234 from other edges in the image frames 302 that are not associated with the perimeter edges 306, such as edges in the background of the image frames 302 and edges of coatings, defects, and the like along interior surface areas of the rotor blades 234. Thus, the boundary detection neural network 304 may be configured to detect semantic boundaries of recognized objects, instead of detecting all edges or boundaries depicted in the image frames 302.

The control circuit 202 is configured to examine the image frames 302 of the series 300 through the layers 314 of artificial neurons of the boundary detection neural network 304 for automated recognition of the perimeter edges 306 by the boundary detection neural network 304. For example, the control circuit 202 may introduce the image frames 302 of the series 300 to an input layer 314A of the boundary detection neural network 304. The image frames 302 may be introduced one at a time as input images in a forward propagation direction through the layers 314. For example, the first image frame 302A may be examined through the layers 314 prior to examining a second image frame 302B.

Similar to the neural network 102 shown in FIG. 1, the layers 314 of the boundary detection neural network 304 may apply various weights in various functions to each of the input image frames 302 to recognize the longitudinal edges 312 and the distal edges 310 of the rotor blades 234 depicted in the image frames 302. For example, the neural network 304 may determine object class probabilities for each of the pixels in the image frames 302, and the object class probabilities may be determined by calculating likelihoods that the pixels represent different object classes. For example, a first object class may represent a distal (or vertical) edge of a rotor blade, a second object class may represent a longitudinal (or horizontal) edge of a rotor blade, a third object class may represent the background behind the rotor blades, and a fourth object class may represent a surface area of a rotor blade (e.g., interior of the distal and longitudinal edges). An example pixel in one of the image frames 302 may be determined by the neural network 304 to have a classification vector of [0.1 0.6 0.2 0.1], which indicates that the pixel has a 60% probability of representing a longitudinal edge of a rotor blade. The neural network 304 may be configured to select the highest probability for each pixel in each of the examined image frames 302. The selected probability may be used to convert a classification vector of the corresponding pixel to a one-hot vector. With respect to the preceding example, the classification vector [0.1 0.6 0.2 0.1] would be converted to the one-hot vector [0 1 0 0], indicating that the pixel is determined to be part of a longitudinal edge 312 of one of the rotor blades 234.

The boundary detection neural network 304 optionally generates a set 320 of output boundary images 322. The output boundary images 322 only show the detected perimeter edges 306, such as the distal edges 310 and the longitudinal edges 312. The pixels that are predicted to represent the background outside of the rotor blades 234 and the surface area of the rotor blades 234 may be blacked out in the output boundary images 322. Each of the output boundary images 322 is generated based on a different one of the image frames 302 examined through the neural network 304. For example, the first output boundary image 322A is generated based on the first image frame 302A, and corresponds to the first image frame 302A. The first output boundary image 322A shows the detected distal edge 310 and lower longitudinal edge 312 of the first rotor blade 234A, and the distal edge 310 of the second rotor blade 234B. The output boundary images 322 may resemble the corresponding input image frames 302, but may not exactly match the input image frames 302 because the neural network 304 may not be 100% accurate in predicting which of the pixels represent perimeter edges 306 of the rotor blades 234.

Figure 4:
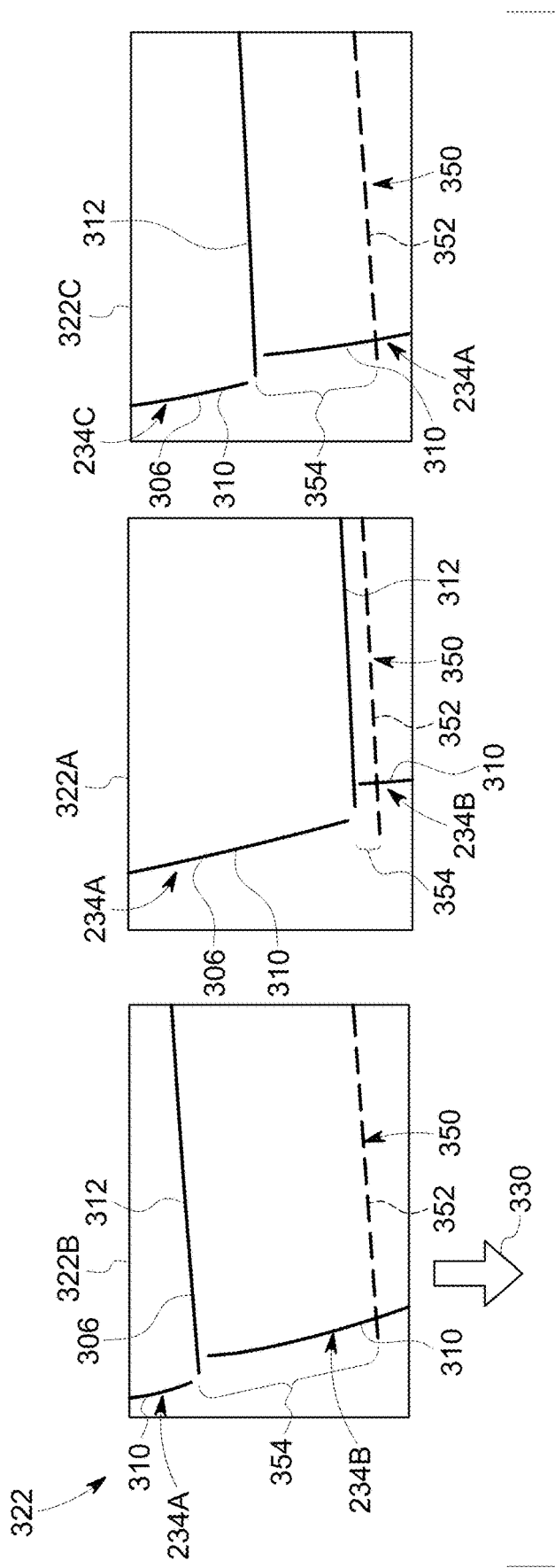
FIG. 4 shows three output boundary images generated by the artificial neural network shown in FIG. 3 according to an embodiment.
Figure 5:
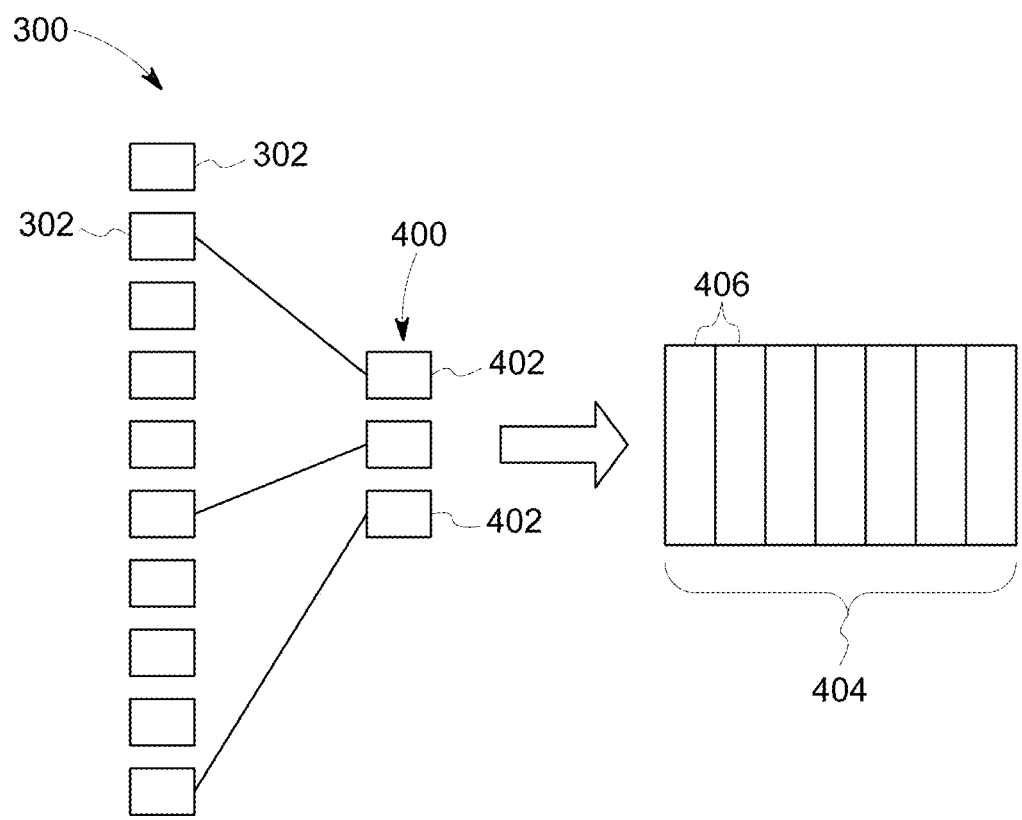
FIG. 5 is a diagram illustrating the series of image frames and a set of the image frames that are identified as key frames according to an embodiment.

In at least one embodiment, the control circuit 202 is configured to utilize the detected perimeter edges 306 of the rotor blades 234 depicted in the output boundary images 322 to identify a set of the image frames 302 as key frames 402 (shown in FIG. 5). The control circuit 202 may identify the key frames 402 based on positional offsets between the perimeter edges 306 in each of the image frames 302 and a reference blade pose 350 (shown in FIG. 4). The reference blade pose 350 represents a desirable position for a rotor blade 234 to occupy within an image frame 302 relative to outer perimeters of the image frame 302.

The reference blade pose 350 may be stored in the memory 206. For example, the memory 206 may store coordinates of the reference blade pose 350. The reference blade pose 350 may be selected or designated by an operator, or may have a default value or position. The reference blade pose 350 may be selected such that a depicted rotor blade 234 that aligns with the reference blade pose 350 is in a good position for performing image analysis for detecting objects-of-interest. For example, a depicted rotor blade 234 that aligns with the reference blade pose 350 may be in a generally centralized position of the image frame 302 and the image frame 302 may depict a relatively large surface area of the rotor blade 234.

FIG. 4 shows three of the output boundary images 322 generated by the boundary detection neural network 304 shown in FIG. 3 according to an embodiment. The three output boundary images 322 are each generated based on a different one of the image frames 302 (shown in FIG. 3) that is input into the neural network 304. For example, the three output boundary images 322 includes the first output boundary image 322A that corresponds to the first image frame 302A, a second output boundary image 322B, and a third output boundary image 322C. The three output boundary images 322A-322C may be based on consecutive image frames 302 in the series 300. For example, the second output boundary image 322B may be generated based on an image frame 302 immediately preceding the first image frame 302A (e.g., captured immediately prior to capturing the first image frame 302A). The third output boundary image 322C may be generated based on an image frame 302 immediately following the first image frame 302A (e.g., captured immediately after capturing the first image frame 302A). Therefore, chronologically, the first output boundary image 322A represents a position of the rotor blades 234 of the turbine assembly 230 (shown in FIG. 2) at a given time that is immediately after the position of the rotor blades 234 depicted in the second output boundary image 322B and immediately prior to the position of the rotor blades 234 depicted in the third output boundary image 322C.

The second output boundary image 322B depicts perimeter edges 306 of the first and second rotor blades 234A, 234B. Specifically, the second output boundary image 322B shows the distal edge 310 and the lower longitudinal edge 312 of the first rotor blade 234A, and the distal edge 310 of the second rotor blade 234B. The first output boundary image 322A also shows the same perimeter edges 306 of the first and second rotor blades 234A, 234B, but the rotor blades 234A, 234B are in different positions than the rotor blades 234A, 234B in the previous, second output boundary image 322B due to the rotation of the turbine assembly 230. For example, in the illustrated embodiment, the rotor blades 234 move in a downward direction 330 through the field of view of the imaging device 208 over time. The third output boundary image 322C shows the distal edge 310 of the first rotor blade 234A at the bottom of the third output boundary image 322C. The third output boundary image 322C also shows the distal edge 310 and the lower longitudinal edge 312 of a third rotor blade 234C adjacent to the first rotor blade 234A. The first rotor blade 234A is disposed between the second rotor blade 234B and the third rotor blade 234C on the turbine assembly 230.

The reference blade pose 350 is superimposed on each of the output boundary images 322A-C shown in FIG. 4. The reference blade pose 350 is represented by a line 352 in the illustrated embodiment, which has a defined position and slope relative to the outer perimeters of the output boundary images 322A-C. Thus, the reference blade pose 350 is shown in the same location in each of the output boundary images 322A-C. The line 352 corresponds to the lower longitudinal edges 312 of the rotor blades 234. The control circuit 202 is configured to determine positional offsets 354 between the reference blade pose 350 and the lower longitudinal edges 312 of the rotor blades 234. The positional offsets 354 may represent distances between the line 352 and the lower longitudinal edges 312. The distance may be calculated or measured based on the number of pixels, or another unit of measurement, that separates the line 352 from the lower longitudinal edge 312. Although the reference blade pose 350 is shown as a generally horizontal line 352 that corresponds to a lower longitudinal edge 312 of a rotor blade 234, the reference blade pose 350 in other embodiments may represent a generally vertical line corresponding to the distal edges 310 of the rotor blades 234, a full perimeter outline of a rotor blade 234, a few selected points representing specific features of the rotor blades 234, such as corners, or the like.

The control circuit 202 may be configured to compare the positional offsets 354 of different output boundary images 322 to determine which image frames 302 depict rotor blades 234 that align with the reference blade pose 350 better than the rotor blades 234 depicted in other image frames 302. For example, a smaller positional offset 354 represents a greater amount of alignment with the reference blade pose 350 than a greater positional offset 354. If the positional offset 354 of a given output boundary image 322 is sufficiently small, relative to a designated threshold or relative to other output boundary images 322, the image frame 302 that corresponds to the given output boundary image 322 may be selected by the control circuit 202 as a key frame 402 (shown in FIG. 5). In the illustrated embodiment, the positional offset 354 of the first output boundary image 322A is less than the positional offsets 354 of the second and third output boundary images 322B, 322C. Therefore, the first image frame 302A corresponding to the first output boundary image 322A has a greater probability of being selected as one of the key frames 402 than the image frames 302 associated with the second and third output boundary images 322B, 322C.

The positional offset 354 may be calculated or measured using a distance transform, an optical flow algorithm, a feature-matching algorithm, a convolutional neural network, or the like.

FIG. 5 is a diagram illustrating the series 300 of image frames 302 and a set 400 of the image frames 302 that are identified as the key frames 402 according to an embodiment. Although ten different image frames 302 are illustrated in FIG. 5, the series 300 may include hundreds or thousands of image frames 302. The set 400 of image frames 302 are selected to represent the key frames 402 based on the positional offsets 354 between the perimeter edges 306 of the depicted rotor blades 234 in the image frames 302 and the reference blade pose 350. The control circuit 202 may be configured to select or identify the key frames 402 out of the total number of image frames 302 according to programmed instructions.

In at least one embodiment, the control circuit 202 is configured to designate a given image frame 302 as a key frame 402 in response to the positional offset 354 between the perimeter edges 306 and the reference blade pose 350 being less than a designated threshold value or range. For example, the designated threshold value may be a designated number of pixels, such as one hundred pixels or two hundred pixels, or may be based on another unit of measurement. The image frames 302 that depict a rotor blade 234 with perimeter edges 306 within the designated threshold value or range from the reference blade pose 350 may be identified as key frames 402. The image frames 302 depicting rotor blades 234 that do not have any perimeter edges 306 within the designated threshold value or range from the reference blade pose 350 are not identified as key frames 402.

In another embodiment, the control circuit 202 is configured to designate a given image frame 302 as a key frame 402 in response to the positional offset 354 between the perimeter edges 306 and the reference blade pose 350 being less than the respective positional offsets 354 in each of the image frames 302 acquired immediately before and after the given image frame 302 in the series 300. For example, the three output boundary images 322A-C shown in FIG. 4 are generated based on three consecutive image frames 302 in the series 300. The positional offset 354 of the first output boundary image 322A is less than the positional offsets 354 of the second and third output boundary images 322B, 322C. Therefore, the positional offset 354 of the first image frame 302A (shown in FIG. 3) is less than each of the positional offsets 354 of the image frames 302 acquired immediately before (e.g., the image frame 302 used to generate the second output boundary image 322B) and immediate after (e.g., the image frame 302 used to generate the third output boundary image 322C). In this scenario, the first image frame 302A, associated with the first output boundary image 322A, satisfies the criteria for selection as one of the key frames 402. The image frames 302 immediately before and after the first image frame 302A do not meet the criteria, and would not be selected as key frames 402.

In yet another embodiment, the control circuit 202 is configured to designate a given image frame 302 as a key frame 402 in response to the positional offset 354 between the perimeter edges 306 and the reference blade pose 350 being less than the positional offsets 354 of a given percentage of the image frames 302 in the series 300. For example, the control circuit 202 may calculate or measure the positional offset 354 for each of the image frames 302 in the series 300, and may rank the image frames 302 based on the positional offsets 354 from lowest (or smallest distance) to highest (or greatest distance). The lowest positional offset 354 represents the image frame 302 depicting perimeter edges 306 of a rotor blade 234 that are most proximate to, or in greatest alignment with, the reference blade pose 350. The control circuit 202 may be configured to identify a given number or percentage of the total image frames 302 having the lowest positional offsets 354 as the key frames 402. In a non-limiting example embodiment, the control circuit 202 may select 20% of the image frames 302 in the series 300 with the lowest positional offsets 354 as the key frames 402, and the remaining 80% of the image frames 302 are not identified as the key frames 402. Therefore, in a series 300 having one hundred image frames 302, the control circuit 202 may designated the twenty image frames 302 with the lowest positional offsets 354 as the set 400 of key frames 402.

Optionally, the number of key frames 402 in the set 400 may correspond to the total number of rotor blades 234 in the turbine assembly 230. For example, the number of key frames 402 may equal the number of rotor blades 234 in the turbine assembly 230. Therefore, for a turbine assembly 230 having one hundred rotor blades 234, the control circuit 202 may be configured to identify one hundred key frames 402. Each of the key frames 402 may depict a different one of the rotor blades 234 in a prime or centralized position in the key frame 402. As used herein, the rotor blade 234 in the prime or centralized position in each of the key frames 402 may be referred to as being in alignment with the reference blade pose 350, although it is recognized that the perimeter edges 306 of the rotor blade 234 in the key frame 402 may be offset from the reference blade pose 350. Referring back to FIG. 4, the first rotor blade 234A is depicted in at least three of the image frames 302, but only the first image frame 302A depicting the first rotor blade 234A is identified as a key frame 402. The control circuit 202 may be configured to select the key frames 402 such that each of the key frames 402 shows a different one of the rotor blades 234 in a prime or centralized position, and all of the rotor blades 234 are represented in the key frames 402. As a result, redundancies in the image data are eliminated or at least reduced.

In an embodiment, the image frames 302 identified as key frames 402 may be inspected using image analysis in order to detect objects-of-interest on the rotor blades 234 of the turbine assembly 230. For example, the key frames 402 may be examined, one at a time, as input images in a forward propagation direction through layers 406 of artificial neurons in an artificial neural network 404. The artificial neural network 404 may represent the neural network 102 shown in FIG. 1, or may be similar to the neural network 102.

The neural network 404 may be trained to detect spalling, cracks, external debris, and other types of defects in the rotor blades 234 as objects-of-interest. Spalling represents an area of a rotor blade 234 in which the coating or barrier, such as a thermal barrier, has flaked off. Detecting spalling and/or a crack in a rotor blade 234 depicted in the key frames 402 may indicate that the rotor blade 234 is damaged and may require maintenance.

The layers 406 of artificial neurons in the neural network 404 may apply various weights in various functions to each of the input key frames 402 to identify probabilities that the objects-of-interest appear in the key frames 402. The neural network 404 determines object class probabilities for the pixels in the key frames 402. For example, a first object class may represent an intact coating on a rotor blade, a second object class may represent a spalling area on the rotor blade, a third object class may represent a crack in the rotor blade, and the like. Although not shown, the neural network 404 may generate a set of output images that resemble the key frames 402.

In at least one embodiment, only the set 400 of the key frames 402 are examined in the neural network 404 for object-of-interest detection, such that the other image frames 302 in the series 300 not identified as key frames 402 are not examined in the neural network 404. The key frames 402 are selected as the image frames 302 that show the rotor blades 234 in preferred or desired positions. The other, "non-key" image frames 302 generally depict portions of the same rotor blades 234 depicted in the key frames 402, but in worse positions. The non-key image frames 302 may contain redundant image data, because the image data is also depicted in the key frames 402. For example, both the first output boundary image 322A and the second output boundary image 322B depict the lower longitudinal edge 312 of the first rotor blade 234A. But, the portion of the first rotor blade 234A depicted in the second output boundary image 322B is also shown in the first output boundary image 322A, and therefore is considered redundant to the first output boundary image 322A. By filtering out the non-key image frames 302 of the series 300, and only examining the key frames 402 for object-of-interest detection, the control circuit 202 may significantly reduce the amount of image data that is analyzed for object-of-interest detection. Reducing the amount of image data to be examined may improve the efficiency of the image analysis (e.g., the computer-based computations) without compromising accuracy or integrity of the inspection because the filtered out image data is redundant to the image data captured in the key frames 402.

Upon examining the key frames 402 in the neural network 404, the control circuit 202 may be configured to implement one or more responsive actions automatically in response to detection of one or more of the objects-of-interest. For example, the control circuit 202 may be configured to automatically schedule maintenance for the turbine assembly 230, automatically alert (e.g., notify) an operator, automatically stop rotation or change a direction of rotation of the turbine assembly 230, generate a report, and/or the like. The control circuit 202 may take one or more of the automated actions by transmitting a control signal to an appropriate device, such as to an audio speaker and/or light assembly to alert an operator. The control circuit 202 may be configured to take appropriate remedial actions automatically, according to programmed instructions, based on the severity of a specific type of object-of-interest detected. For example, the control circuit 202 may generate a report and/or alert an operator in response to detecting spalling, and may be configured to stop rotation of the turbine assembly 230 and/or schedule maintenance in response to detecting one or more cracks in the rotor blades 234.

In at least one embodiment, prior to examining the key frames 402 for object-of-interest detection, the control circuit 202 may be configured to mask or conceal regions of the key frames 402 deemed to represent irrelevant subject matter. For example, as described above, although at least some of the image frames 302 identified as key frames 402 may depict more than one of the rotor blades 234, only one of the depicted rotor blades 234 is located in a prime or centralized position within the key frame 402. As used herein, the rotor blade 234 in the centralized position in each key frame 402 is referred to as a "primary rotor blade" 506. The one or more other rotor blades 234 depicted in the key frames 402 are referred to as "secondary rotor blades". The control circuit 202 may be configured to mask all regions of the key frames 402 outside of the respective primary rotor blades 506. The masked regions may be areas of the key frames 402 that show background subject matter, secondary rotor blades, other parts of the turbine assembly 230, and/or the like. The control circuit 202 may mask the regions outside of the primary rotor blade 506 in each key frame 402 by superimposing a mask image 502 (shown in FIG. 6) on each of the key frames 402.

Figure 6:
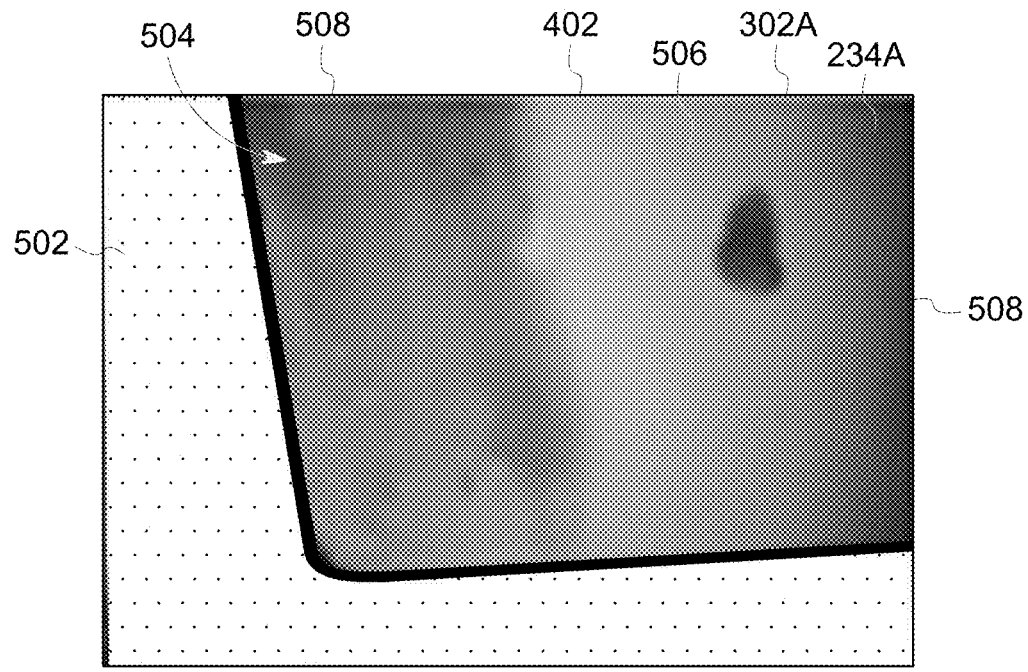
FIG. 6 illustrates a mask image superimposed on one of the key frames according to an embodiment.

FIG. 6 illustrates the mask image 502 superimposed on one of the key frames 402 according to an embodiment. The key frame 402 may be the first image frame 302A shown in FIG. 3. The mask image 502 is configured to conceal all portions of the key frame 402 except for an exposed region 504. The exposed region 504 is defined by the contours of the mask image 502, and may be partially defined by perimeter boundaries 508 of the key frame 402. The exposed region 504 displays a surface area of the primary rotor blade 506 in the respective key frame 402. When the key frame 402 is the first image frame 302A, the primary rotor blade 506 depicted in the key frame 402 is the first rotor blade 234A shown in FIG. 3.

The control circuit 202 is configured to mask the regions of the key frame 402 outside of the primary rotor blade 506 in order to neglect redundant and irrelevant image data. For example, in an embodiment, only the image data within the exposed regions 504 of the key frames 402 (e.g., which is not masked) is examined for object-of-interest detection. As such, the image analysis for each key frame 402 may be performed only on the image data depicting the primary rotor blade 506, ignoring the image data depicting the background and any secondary rotor blades 234. The image data depicting background subject matter outside of the rotor blades 234 may be irrelevant because the objects-of-interest are only located on the rotor blades 234. Each of the secondary rotor blades 234 depicted in a given key frame 402 may be depicted in another key frame 402 as a primary rotor blade 234. For example, the second rotor blade 234B in the first image frame 302A shown in FIG. 3 is a secondary rotor blade in the first image frame 302A, but may be a primary rotor blade 506 in another one of the key frames 402 (not shown). Masking the second rotor blade 234B in the first image frame 302A merely eliminates redundant image data, since the second rotor blade 234B may be examined for object-of-interest detection in another one of the key frames 402.

Thus, in addition to filtering out the image frames 302 in the series 300 that are not identified as key frames 402, the control circuit 202 may also be configured to filter out the image data in each of the key frames 402 that is outside of the respective primary rotor blade 506. Optionally, the only image data that may be examined for object-of-interest detection may be the image data within the exposed regions 504 of the key frames 402.

The mask image 502 may be based on a binary template mask image 602 (shown in FIG. 7) that is stored in the memory 206. As described above with reference to FIG. 4, the primary rotor blades 506 within the key frames 402 may not align perfectly with the reference blade pose 350. The primary rotor blades 506 within different key frames 402 may also be at least partially offset from one another. In order to ensure that the exposed region 504 of the mask image 502 aligns with the primary rotor blade 506 of each of the key frames 402, the control circuit 202 may be configured to deform the template mask image 602 to generate a customized mask image 502 for each of the key frames 402.

Figure 7:
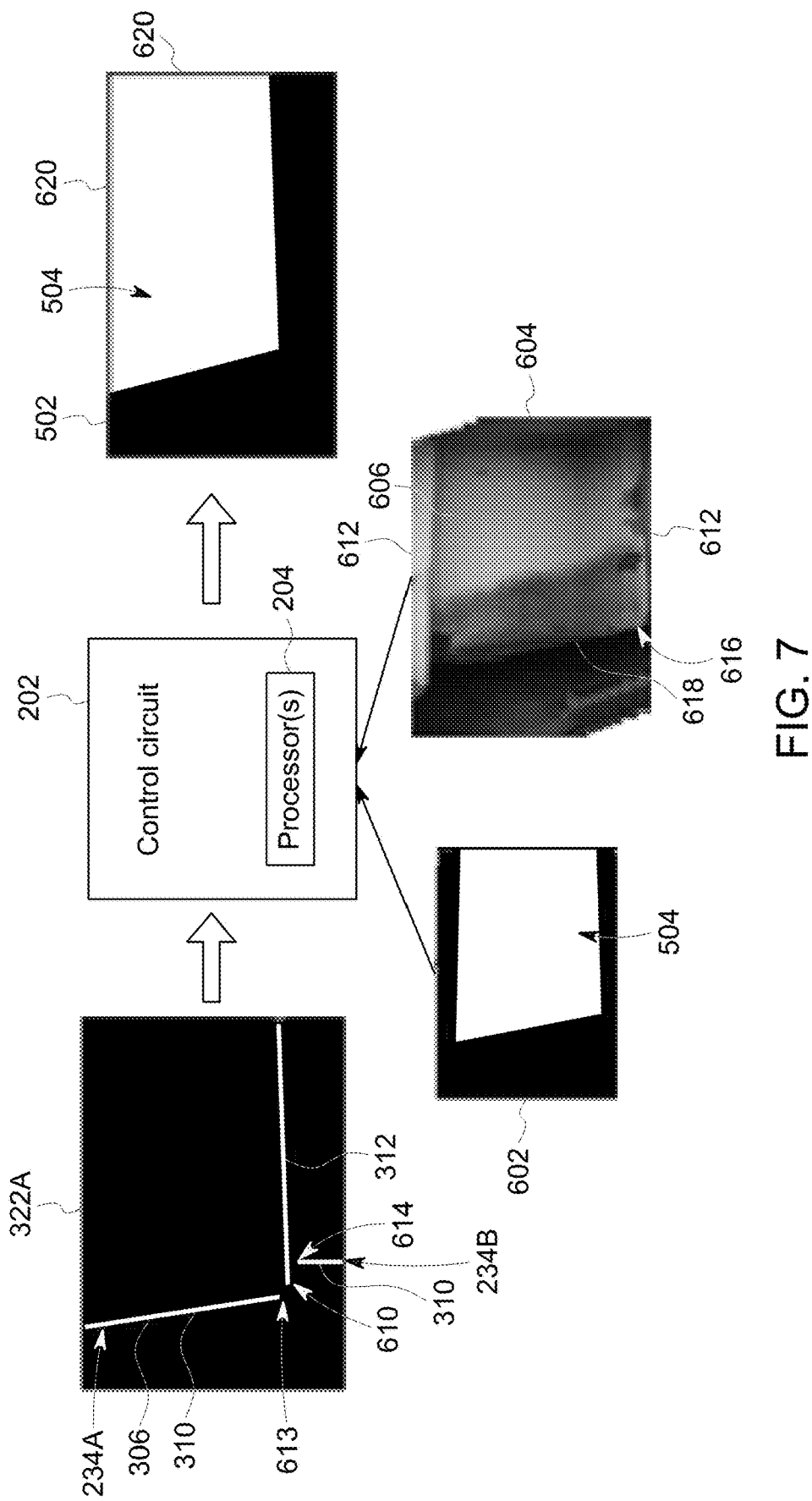
FIG. 7 is a diagram illustrating how a control circuit deforms a template mask image to fit the template mask image to each individual key frame, according to an embodiment.

FIG. 7 is a diagram illustrating the images relied on by the control circuit 202 to deform the template mask image 602 for fitting to each individual key frame 402, according to an embodiment. In an embodiment, the control circuit 202 (e.g., including the one or more processors 204 thereof) is configured to deform the template mask image 602 based on the perimeter edges 306 of the one or more rotor blades 234 depicted in each of the key frames 402. For example, FIG. 7 show the first output boundary image 322A associated with the first image frame 302A (that is one of the key frames 402). The control circuit 202 deforms or aligns the template mask image 602 to fit the first image frame 302A based on the perimeter edges 306 within the first output boundary image 322A.

In at least one embodiment, the memory 206 may store both the template mask image 602 and a template blade image 604 depicting a sample rotor blade 606. The template mask image 602 may be associated with and/or based on the template blade image 604. For example, the exposed region 504 of the template mask image 602 may be sized and positioned to align with the sample rotor blade 606 in the template blade image 604. The template blade image 604 may depict an entire height of the sample rotor blade 606 between lower and upper longitudinal edges 612 thereof. The template blade image 604 may be acquired by adjusting the field of view of the imaging device 208 (shown in FIG. 2) to capture the entire height of one of the rotor blades 234 of the turbine assembly 230, or may be generated by combining multiple image frames 302. For example, the template blade image 604 may be generated by combining (e.g., overlaying) pixel characteristics from multiple consecutive image frames 302 in the series 300.

The control circuit 202 may be configured to compare the template blade image 602 to the perimeter edges 306 in the first output boundary image 322A associated with the first image frame 302A to determine relationships between the perimeter edges 306 and the template blade image 604. The control circuit 202 may utilize the determined relationships to deform and/or align the template mask image 602 such that a generated mask image 502 fits the first image frame 302A. For example, the control circuit 202 may perform feature matching. The feature matching includes identifying a first set of designated features of the perimeter edges 306 in the first output boundary image 322A, and determining coordinates of the first set of designated features. The designated features may include a distal end 610 of the lower longitudinal edge 312, a lower end 613 of the distal edge 310 of the first rotor blade 234A, a top end 614 of the distal edge 310 of the second rotor blade 234B, lengths of the distal edge 310 and lower longitudinal edge 312 of the first rotor blade 234A depicted in the respective image, a length of the distal edge 310 of the second rotor blade 234B, and/or the like. The coordinates and lengths of the designated features may be determined for both the first output boundary image 322A and the template blade image 604. The control circuit 202 may group the data (e.g., coordinates, lengths, etc.) about each of the designated features in the first output boundary image 322A with the associated data from the template blade image 604 to generate data pairs. For example, the coordinates of the lower end 613 of the distal edge 310 of the first rotor blade 234A in the first output boundary image 322A may be grouped into a data pair with the coordinates of a lower end 616 of a distal edge 618 of the sample rotor blade 606.

The control circuit 202 may be configured to generate or calculate a transfer (or warping) function configured to reduce the offset between the data in each of the pairs. The control circuit 202 may then apply the transfer function to the template mask image 602 to deform the template mask image 602 according to the transfer function. The template mask image 602 may be deformed by translationally and/or rotationally adjusting the position of the template mask image 602 relative to fixed frame boundaries 620. The template mask image 602 may also be deformed by compressing one or more portions of the template mask image 602 and/or elongating one or more portions of the template mask image 602. The template mask image 602 may be deformed regularly or irregularly. The control circuit 202 uses the transfer function to generate a deformed mask image 502, which is the mask image 502 that is shown in FIG. 6. In the illustrated embodiment, the exposed region 504 in the deformed mask image 502 may be shifted vertically upwards and expanded relative to the exposed region 504 in the template mask image 602. In an embodiment, the control circuit 202 superimposes the deformed mask image 502 on the first image frame 302A to achieve the masked key frame 402 shown in FIG. 6.

Figure 8:
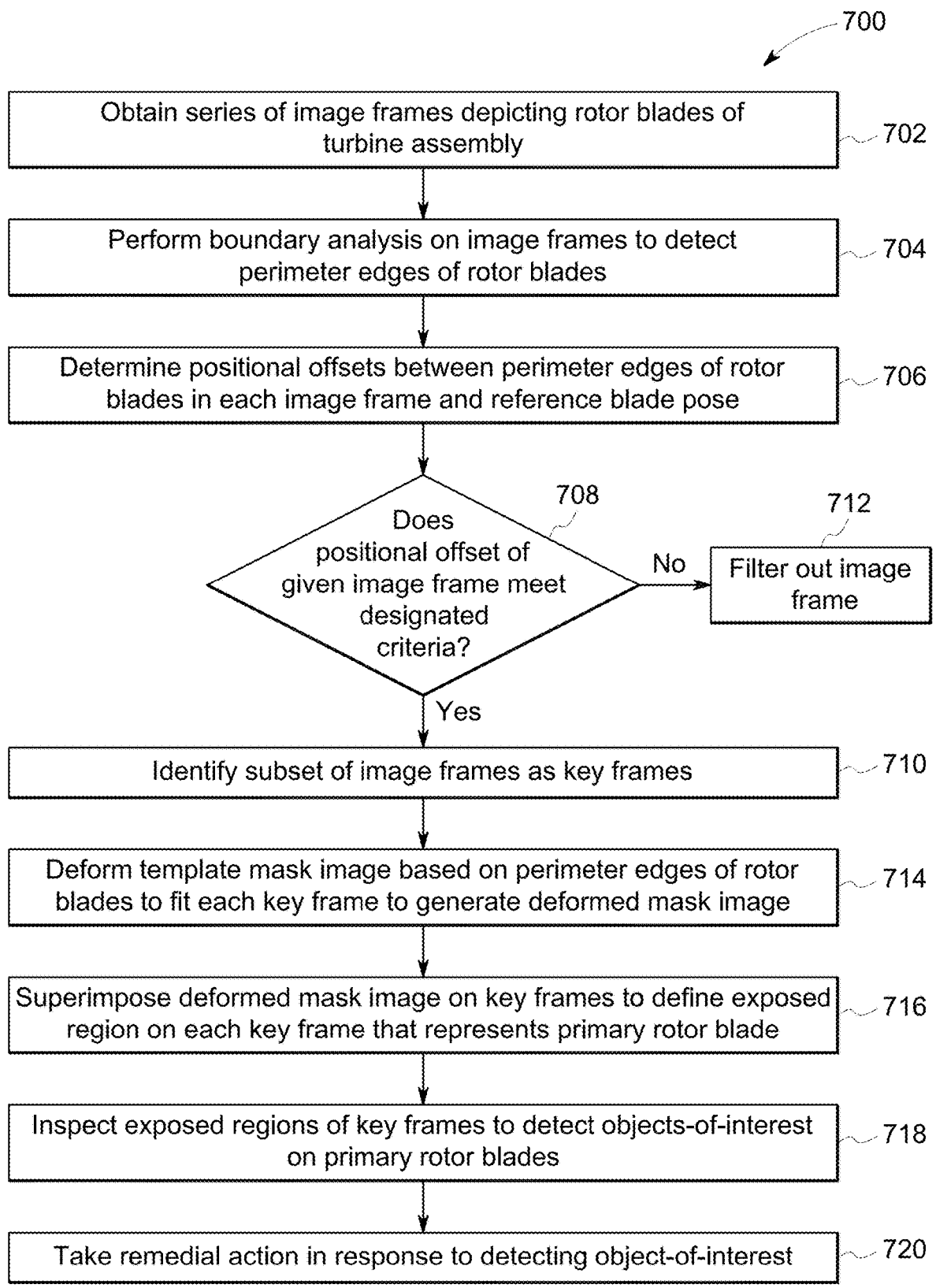
FIG. 8 is a flowchart of a method for performing image-based inspection of a target object according to an embodiment.

FIG. 8 is a flowchart of a method 700 for performing image-based inspection of a target object according to an embodiment. The method 700 may represent at least some of the operations performed by the control circuit 202, including the one or more processors 204 thereof, shown in FIG. 2. The method 700 may utilize one or more artificial neural networks, such as one or more of the artificial neural networks 102, 304, 404 described herein. The method 700 may represent an algorithm used to create (e.g., write) one or more software applications that direct operation of one or more processors and/or neural networks. The method 700 is described below with reference to a turbine assembly, such as the turbine assembly 230 shown in FIG. 2, as the target object that is inspected, but the method 700 may be used for inspecting other target objects.

At 702, a series of image frames are obtained that depict rotor blades of the turbine assembly. The image frames may be obtained from an imaging device as the turbine assembly rotates. Each of the image frames may depict one or more of the rotor blades.

At 704, boundary analysis is performed on the image frames to detect perimeter edges of the rotor blades depicted in each of the image frames. The boundary analysis may be performed by one or more processors. In an embodiment, the boundary analysis is performed by examining each of the image frames one at a time as input images in a forward propagation direction through layers of artificial neurons in an artificial neural network.

At 706, positional offsets are determined between the perimeter edges of the rotor blades in each image frame relative to a reference blade pose. The reference blade pose may be stored in a memory, and may represent a desired position for a rotor blade to occupy within a given image frame. The positional offsets may be determined by calculating or measuring distances between the reference blade pose and one or more of the perimeter edges of the rotor blades in each image frame.

At 708, it is determined whether the positional offset of a given image frame meets designated criteria. In at least one embodiment, the designated criteria may be a designated threshold value or range, such that the positional offset of a given image frame meets the designated criteria if the positional offset is less than the designated threshold. The designated threshold may represent a number of pixels or other units of measurement. In another embodiment, the positional offset of a given image frame meets the designated criteria if the positional offset is less than respective positional offsets of the image frames immediately preceding and following the given image frame. Therefore, the positional offset of the given image frame may represent a local minimum positional offset. In yet another embodiment, the positional offset of a given image frame meets the designated criteria if the positional offset is less than respective positional offsets of a designated number or percentage of the image frames in the series. For example, the designated percentage may be 20%, such that the 20% of the image frames with the lowest positional offsets relative to the reference blade pose meet the designated criteria.

If the positional offset of a given image frame meets the designated criteria, then flow proceeds to 710, and the given image frame is identified as a key frame. The determination at 708 may be performed for each of the image frames in the series in order to identify a set of the image frames as key frames. If, on the other hand, the positional offset of a given image frame does not meet the designated criteria, flow proceeds to 712 and the image frame is filtered out or ignored during subsequent portions of the inspection. In an embodiment, all of the image frames that are not identified as key frames are filtered out at 712.

At 714, a template mask image is deformed based on the perimeter edges of the rotor blades depicted in each key frame in order to generate a deformed mask image that fits the respective key frame. The template mask image may be deformed by comparing specific features along the perimeter edges to corresponding specific features within a template blade image associated with the template mask image. For example, a transfer or warping function may be generated based on the comparison, and the transfer function may be applied to the template mask image to generate the deformed mask image. Each deformed mask image may be specific to a different one of the key frames.

At 716, the deformed mask image is superimposed on the corresponding key frame to define an exposed region on each key frame that represents a primary rotor blade. For example, the deformed mask image may cover and conceal all regions of the key frame outside of the primary rotor blade. The area within the exposed region of the deformed mask image may be associated with a surface area of the primary rotor blade.

At 718, the exposed regions of the key frames are inspected to detect objects-of-interest on the primary rotor blades thereof. In an embodiment, only the image data in the exposed regions of the key frames of the series of image frames is inspected for object-of-interest detection, in order to improve the efficiency of the inspection by neglecting redundant and irrelevant image data. The objects-of-interest may include spalling along surfaces of the rotor blades and/or cracks along edges of the rotor blades.

At 720, in response to detecting an object-of-interest, appropriate remedial action is taken. For example, the appropriate remedial action may include automatically scheduling maintenance for the turbine assembly, automatically generating report to record the detection of the object-of-interest, automatically alerting an operator, and/or automatically stopping rotation of the turbine assembly. The specific remedial action taken may depend on the specific object-of-interest that is detected, such that different remedial actions may be appropriate in different situations.

Regardless of whether or not an object-of-interest is detected, an inspection report may be generated to record the results of the inspection. The inspection report includes details about the inspection, including the date of the inspection, the subject (e.g., rotor assembly) being inspected, and the like. The results of the inspection report may include information about the type, number, size, and/or location of objects-of-interest detected. The inspection report may be generated automatically without human intervention. The inspection report may be stored locally in a memory device and/or transmitted to a remote server or memory device for remote storage and access.

Certain embodiments of the present disclosure provide a system (e.g., an inspection system) that includes one or more processors configured to detect perimeter edges of one or more rotor blades of a turbine assembly as depicted in a series of image frames using boundary analysis performed on the image frames. The one or more processors are configured to identify a set of the image frames as key frames based on positional offsets between the perimeter edges that are detected in the image frames and a reference blade pose such that the key frames are able to be inspected for objects-of-interest without inspecting the image frames that are not the key frames.

Optionally, the one or more processors are configured to perform the boundary analysis by individually examining the image frames one at a time as input images in a forward propagation direction through layers of artificial neurons in an artificial neural network.

Optionally, the one or more processors are configured to inspect the key frames for objects-of-interest by individually examining each of the key frames one at a time as input images in a forward propagation direction through layers of artificial neurons in an artificial neural network.

Optionally, the one or more processors are further configured to apply a mask image on the key frames to define an exposed region on the key frames that is not concealed by the mask image. The one or more processors are further configured to inspect the exposed regions of the key frames to detect objects-of-interest within the exposed regions without inspecting regions of the key frames outside of the exposed regions and without inspecting the image frames that are not the key frames.

Optionally, the one or more processors are further configured to superimpose a mask image on the key frames based on the perimeter edges that are detected in the image frames identified as the key frames. The mask image defines an exposed region on each of the key frames that is not concealed by the mask image. The exposed region represents a surface area of a primary rotor blade of the one or more rotor blades in the corresponding key frame. The one or more processors may be further configured to compare a template blade image to the perimeter edges of the one or more rotor blades in each of the key frames. The template blade image depicts a sample rotor blade. The one or more processors also may be configured to deform a template mask image associated with the template blade image to generate the mask image that is superimposed on the key frames based on the comparison between the template blade image and the perimeter edges.

Optionally, the one or more processors are configured to identify a corresponding image frame in the series as one of the key frames in response to the positional offset between the perimeter edges that are detected in the corresponding image frame and the reference blade pose being less than a designated threshold value.

Optionally, the one or more processors are configured to identify a corresponding image frame in the series as one of the key frames in response to the positional offset in the corresponding image frame being less than the respective positional offsets in each of the image frames acquired immediately before and after the corresponding image frame in the series.

Optionally, the objects-of-interest include one or more of spalling or cracks in the rotor blades. Responsive to detecting one or more of the objects-of-interest, the one or more processors are configured to one or more of automatically schedule maintenance for the turbine assembly, automatically alert an operator, or automatically stop rotation of the turbine assembly.

Optionally, each of the image frames depicts a plurality of the rotor blades of the turbine assembly while the turbine assembly rotates, and each of the key frames depicts a primary rotor blade of the respective plurality of rotor blades in a centralized position within the key frame. The one or more processors are further configured to mask regions of the key frames outside of the respective primary rotor blades.

Certain embodiments of the present disclosure provide a method for performing image-based target object inspection. The method includes obtaining a series of image frames depicting multiple rotor blades of a turbine assembly while the turbine assembly rotates. Each of the image frames depicts one or more of the rotor blades. The method includes detecting perimeter edges of the one or more rotor blades depicted in each of the image frames using boundary analysis performed on the image frames by one or more processors, and identifying, via the one or more processors, a set of the image frames as key frames based on positional offsets between the perimeter edges that are detected in the image frames and a reference blade pose. The method also includes inspecting the key frames for objects-of-interest without inspecting the image frames that are not in the set of the key frames.

Optionally, a corresponding image frame in the series is identified as one of the key frames in response to the positional offset between the perimeter edges that are detected in the corresponding image frame and the reference blade pose being less than a designated threshold value.

Optionally, a corresponding image frame in the series is identified as one of the key frames in response to the positional offset in the corresponding image frame being less than the respective positional offsets in each of the image frames acquired immediately before and after the corresponding image frame in the series.

Optionally, each of the key frames depicts a different one of the rotor blades of the turbine assembly disposed in alignment with the reference blade pose.

Optionally, a total number of the key frames within the set equals an amount of the rotor blades of the turbine assembly.

Optionally, the detecting of the perimeter edges of the one or more rotor blades comprises individually examining the image frames one at a time as input images in a forward propagation direction through layers of artificial neurons in an artificial neural network.

Optionally, the objects-of-interest include one or more of spalling or cracks in the rotor blades. Responsive to detecting one or more of the objects-of-interest while inspecting the key frames, the method includes one or more of automatically scheduling maintenance for the turbine assembly, automatically alerting an operator, automatically generating an inspection report, or automatically stopping rotation of the turbine assembly.

Optionally, the method further includes superimposing a mask image on the key frames based on the perimeter edges that are detected. The mask image defines an exposed region on each of the key frames that is not concealed by the mask image. The exposed region represents a surface area of a primary rotor blade of the one or more rotor blades in the key frame. Optionally, inspecting the key frames for the objects-of-interest includes inspecting the exposed regions of the key frames for detecting the objects-of-interest on the respective primary rotor blades of the key frames without inspecting regions of the key frames outside of the exposed regions. Optionally, the method further includes comparing a template blade image to the perimeter edges of the one or more rotor blades in each of the key frames. The template blade image depicts a sample rotor blade. The method further includes deforming a template mask image associated with the template blade image to generate the mask image for each of the key frames based on the comparison between the template blade image and the perimeter edges.

Certain embodiments of the present disclosure provide a method for performing image-based target object inspection. The method includes detecting perimeter edges of one or more rotor blades of a turbine assembly as depicted in a series of image frames using boundary analysis performed on the image frames by one or more processors, and identifying, via the one or more processors, a set of the image frames as key frames based on positional offsets between the perimeter edges that are detected in the image frames and a reference blade pose. The method also includes applying a mask image on the key frames to define an exposed region on the key frames. The exposed region represents a surface area of a primary rotor blade in the respective key frame. The method further includes inspecting the exposed regions of the key frames to detect objects-of-interest on the respective primary rotor blades without inspecting regions of the key frames outside of the exposed regions.

Optionally, applying the mask image includes deforming a template mask image to generate a deformed mask image that is superimposed on the key frames to define the respective exposed regions of the key frames. The template mask image is deformed based on the perimeter edges that are detected in each of the key frames.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
one or more processors configured to detect perimeter edges of one or more rotor blades of a turbine assembly as depicted in a series of image frames using boundary analysis performed on the image frames,
wherein the one or more processors are configured to identify a set of the image frames as key frames based on positional offsets between the perimeter edges that are detected in the image frames and a reference blade pose such that the key frames are able to be inspected for objects-of-interest without inspecting the image frames that are not the key frames,
wherein the one or more processors are further configured to superimpose a mask image on the key frames based on the perimeter edges that are detected in the image frames identified as the key frames, the mask image defining an exposed region on each of the key frames that is not concealed by the mask image, the exposed region representing a surface area of a primary rotor blade of the one or more rotor blades in the corresponding key frame.

2. The system of claim 1, wherein the one or more processors are configured to perform the boundary analysis by individually examining the image frames one at a time as input images in a forward propagation direction through layers of artificial neurons in an artificial neural network.

3. The system of claim 1, wherein the one or more processors are configured to inspect the key frames for objects-of-interest by individually examining each of the key frames one at a time as input images in a forward propagation direction through layers of artificial neurons in an artificial neural network.

4. The system of claim 1, wherein the one or more processors are further configured to inspect the exposed regions of the key frames to detect objects-of-interest within the exposed regions without inspecting regions of the key frames outside of the exposed regions and without inspecting the image frames that are not the key frames.

5. The system of claim 1, wherein the one or more processors are further configured to compare a template blade image to the perimeter edges of the one or more rotor blades in each of the key frames, the template blade image depicting a sample rotor blade, the one or more processors also configured to deform a template mask image associated with the template blade image to generate the mask image that is superimposed on the key frames based on the comparison between the template blade image and the perimeter edges.

6. The system of claim 1, wherein the one or more processors are configured to identify a corresponding image frame in the series as one of the key frames in response to the positional offset between the perimeter edges that are detected in the corresponding image frame and the reference blade pose being less than a designated threshold value.

7. The system of claim 1, wherein the one or more processors are configured to identify a corresponding image frame in the series as one of the key frames in response to the positional offset in the corresponding image frame being less than the respective positional offsets in each of the image frames acquired immediately before and after the corresponding image frame in the series.

8. The system of claim 1, wherein the objects-of-interest include one or more of spalling or cracks in the rotor blades, and, responsive to detecting one or more of the objects-of-interest, the one or more processors are configured to one or more of automatically schedule maintenance for the turbine assembly, automatically alert an operator, automatically generate an inspection report, or automatically stop rotation of the turbine assembly.

9. The system of claim 1, wherein each of the image frames depicts a plurality of the rotor blades of the turbine assembly while the turbine assembly rotates, and each of the key frames depicts a primary rotor blade of the respective plurality of rotor blades in a centralized position within the key frame, the one or more processors further configured to mask regions of the key frames outside of the respective primary rotor blades.

10. A method comprising:
obtaining a series of image frames depicting multiple rotor blades of a turbine assembly while the turbine assembly rotates, each of the image frames depicting one or more of the rotor blades;
detecting perimeter edges of the one or more rotor blades depicted in each of the image frames using boundary analysis performed on the image frames by one or more processors;
identifying, via the one or more processors, a set of the image frames as key frames based on positional offsets between the perimeter edges that are detected in the image frames and a reference blade pose;
superimposing a mask image on the key frames based on the perimeter edges that are detected, the mask image defining an exposed region on each of the key frames that is not concealed by the mask image, the exposed region representing a surface area of a primary rotor blade of the one or more rotor blades in the key frame; and
inspecting the key frames for objects-of-interest without inspecting the image frames that are not in the set of the key frames.

11. The method of claim 10, wherein a corresponding image frame in the series is identified as one of the key frames in response to the positional offset between the perimeter edges that are detected in the corresponding image frame and the reference blade pose being less than a designated threshold value.

12. The method of claim 10, wherein a corresponding image frame in the series is identified as one of the key frames in response to the positional offset in the corresponding image frame being less than the respective positional offsets in each of the image frames acquired immediately before and after the corresponding image frame in the series.

13. The method of claim 10, wherein each of the key frames depicts a different one of the rotor blades of the turbine assembly disposed in alignment with the reference blade pose.

14. The method of claim 10, wherein the detecting of the perimeter edges of the one or more rotor blades comprises individually examining the image frames one at a time as input images in a forward propagation direction through layers of artificial neurons in an artificial neural network.

15. The method of claim 10, wherein the objects-of-interest include one or more of spalling or cracks in the rotor blades, and, responsive to detecting one or more of the objects-of- interest while inspecting the key frames, the method includes one or more of automatically scheduling maintenance for the turbine assembly, automatically alerting an operator, automatically generating an inspection report, or automatically stopping rotation of the turbine assembly.

16. The method of claim 10, wherein inspecting the key frames for the objects-of-interest includes inspecting the exposed regions of the key frames for detecting the objects-of-interest on the respective primary rotor blades of the key frames without inspecting regions of the key frames outside of the exposed regions.

17. The method of claim 10, further comprising comparing a template blade image to the perimeter edges of the one or more rotor blades in each of the key frames, the template blade image depicting a sample rotor blade, the method further comprising deforming a template mask image associated with the template blade image to generate the mask image for each of the key frames based on the comparison between the template blade image and the perimeter edges.

18. A method comprising:
    detecting perimeter edges of one or more rotor blades of a turbine assembly as depicted in a series of image frames using boundary analysis performed on the image frames by one or more processors;
    identifying, via the one or more processors, a set of the image frames as key frames based on positional offsets between the perimeter edges that are detected in the image frames and a reference blade pose;
    applying a mask image on the key frames to define an exposed region on the key frames, the exposed region representing a surface area of a primary rotor blade in the respective key frame; and
    inspecting the exposed regions of the key frames to detect objects-of-interest on the respective primary rotor blades without inspecting regions of the key frames outside of the exposed regions.

19. The method of claim 18, wherein applying the mask image includes deforming a template mask image to generate a deformed mask image that is superimposed on the key frames to define the respective exposed regions of the key frames, the template mask image being deformed based on the perimeter edges that are detected in each of the key frames.

* * * * *